United States Patent [19]
Schmidt

[11] 3,797,495
[45] Mar. 19, 1974

[54] PRESSURE SENSITIVE ADHESIVE TAPE AND DISPOSABLE DIAPER

[75] Inventor: George F. Schmidt, Neenah, Wis.

[73] Assignee: Kimberly-Clark Corporation, Neenah, Wis.

[22] Filed: Feb. 1, 1973

[21] Appl. No.: 328,731

[52] U.S. Cl............... 128/287, 117/122 PA
[51] Int. Cl............................................. A41b 13/02
[58] Field of Search......... 128/156, 287; 117/122 R, 117/122 P, 122 PA, 122 PB

[56] References Cited
UNITED STATES PATENTS

| | | | |
|---|---|---|---|
| 2,607,711 | 8/1952 | Hendricks | 117/122 P |
| 3,068,117 | 12/1962 | Korpman | 117/122 PB |
| 3,161,533 | 12/1964 | Gaynes | 117/122 PA |
| 3,464,848 | 9/1969 | Hechtman et al | 117/122 PB |
| 3,625,752 | 12/1971 | Korpman | 117/122 PA |
| 3,660,323 | 5/1972 | Raguse | 117/122 PA |
| 3,681,190 | 8/1972 | Dahlquist | 117/122 PA |
| 3,740,366 | 6/1973 | Sanderson et al | 117/122 PB |
| 3,630,201 | 12/1971 | Endres | 128/287 |

Primary Examiner—Charles F. Rosenbaum
Attorney, Agent, or Firm—Daniel J. Hanlon, Jr.; William D. Herrick; Raymond J. Miller

[57] ABSTRACT

Pressure sensitive adhesive tape having a backsized, reinforced fibrous backing, a pigmented, plasticized polyvinyl chloride backsize, a release coat of silicone rubber, and an aggressively tacky adhesive of a block copolymer of isoprene and styrene tackified with a polyolefin and plasticized with an extended oil. Particular utility as a disposable diaper fastener is disclosed.

10 Claims, 3 Drawing Figures

PATENTED MAR 19 1974   3,797,495
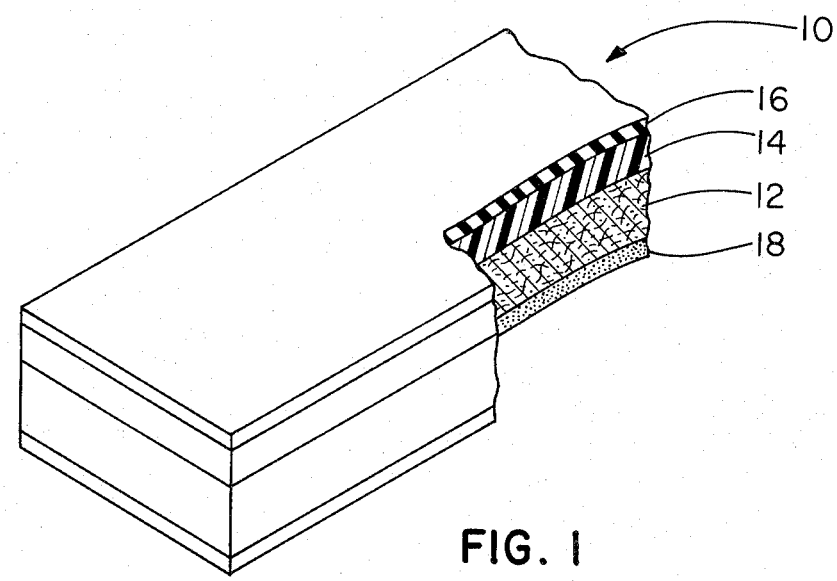
FIG. 1
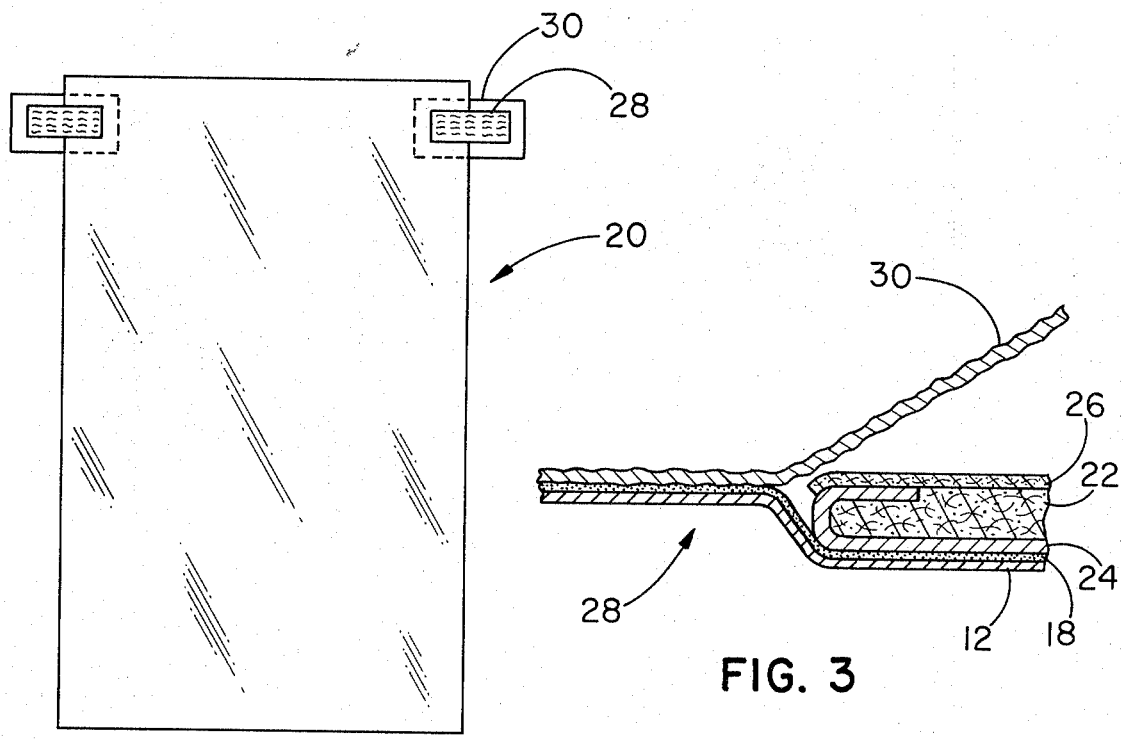
FIG. 2
FIG. 3

PRESSURE SENSITIVE ADHESIVE TAPE AND DISPOSABLE DIAPER

BACKGROUND OF THE INVENTION

In the manufacture of disposable diapers it has proven desirable to have positive fastening means other than ordinary safety pins. From the point of view of both safety and convenience, such an improved fastener is advantageous. Especially desirable is an improved fastener that is both economical and forms an integral part of the diaper.

It has been suggested that strips of ordinary pressure sensitive adhesive tape would serve this purpose. However, most conventional tapes of this type do not have a sufficiently aggressive adhesive to remain adhered during normal use to the surface of polyolefin films such as polyethylene which are commonly used as impervious backings for such diapers. The problem is further aggravated when an embossed film is used to provide more attractive feel and appearance. Consequently, when ordinary tapes are used as fasteners in the form of attachment strips, the strips frequently become detached prematurely before the diaper is ready for use. In addition, once the diaper is in place on the wearer, if the adhesive does not adhere firmly, the fastening strip may become loose and therefore be ineffective. When tack is increased to overcome these premature detachment problems, another problem arises in trying to provide a suitable protective release strip for temporarily covering the adhesive on the unattached half of the fastening strip.

Conventional release strips for covering pressure sensitive adhesives are designed for easy release. In certain instances, as a result, these sheets tend to become displaced prematurely during handling of the diaper, uncovering the adhesive mass and causing it to stick inadvertently to a wrong portion of the diaper or to an adjacent diaper in a package, whereupon these diapers may be rendered useless. If the release sheet is designed with sufficient adherent power to stay in place prior to using the diaper, it sometimes is difficult to remove the sheet without tearing the other end of the strip from the diaper backing, or causing transfer of adhesive to the protective strip, or rupturing the tape itself. It is highly desirable, therefore, to provide a pressure sensitive adhesive tape for diaper fastening purposes in which one end adheres firmly to the film backing of the diaper and the free end lends itself to easy release from a protective cover strip without destroying the adhesive power of the pressure sensitive mass.

With this invention there is disclosed a pressure sensitive adhesive tape adapted for use with disposable, film-backed diapers which adheres to the film backing with sufficient firmness to insure against displacement in normal handling and which, when provided with a protective cover sheet, can be detached therefrom without damage to the tape, the adhesive mass, or the diaper.

SUMMARY OF THE INVENTION

Pressure-sensitive tape strips normally found suitable for use with disposable diapers usually have a width of from about ½ inch to ¾ inch and a length of from about 2½ inches to 3 inches. These tapes are ordinarily supplied in rolls and cut to the required dimension for application to the diaper.

The backing designed for use in making such tapes must be able to withstand tear and tensile forces not normally encountered by pressure sensitive adhesive tapes. As the wearer twists and turns or makes other normal movements, substantial forces are applied across the narrow dimension of the tape in varying directions and degrees. Many common tape backings lack suitable strength characteristics to withstand these unusual use requirements, and special attention must, therefore, be given to providing higher tear and tensile properties.

In addition to having the above requirements with respect to tensile and tear, the tape must have sufficient adhering power to the surface of polyethylene or similar films used for the diaper backing so that it does not release prematurely. A tape having such adhering strength will tear the diaper backing (usually a polyethylene film 1 mil thick) rather than release therefrom, when the stress is applied in shear.

The pressure sensitive adhesive utilized for the tape of my invention includes a block copolymer of isoprene and styrene tackified with a polyolefin and extended with an oil.

Since the preferred tape arrangement for application to disposable diapers is in roll form, the tape must be capable of being rolled and stored for an extended period prior to use without blocking. Liners may be used to prevent blocking but, because of cost, are generally to be avoided. I prefer to use a release coat which provides for easy unwind without adhesive transfer.

The release coat of the tape of the invention utilizes a silicone rubber which may include controlled release additives. A backsize coating is also desirable to provide a suitably smooth surface and a barrier to the undesirable penetration of the release coating into the tape backing. A backsize composition consisting of a blend of polyacrylate and polyvinyl chloride has been found suitable. The backsize coating may be pigmented for increased opacity and for a pleasing appearance.

A further requirement of the tape is that it be easily releasable from the protective release strip applied to the unattached tape portion. The tape must stick to the release strip during normal handling but be readily separated at the time the diaper is used. An example of a protective release strip is a polyethylene film having raised embossments of limited area and applied to the adhesive in a manner such that the raised portions contact the adhesive. In this manner the contact area and, therefore, the effective level of adherence of the tape to the release strip is reduced. Thus the embossed release strip remains attached to the tape prior to use and yet is easily removed when necessary.

When the raised embossments comprise approximately a third of the total surface area of the release strip, the degree of adhesion between the tape and the strip usually falls within the acceptable range. Suitably constructed release strips of other types consisting of paper or polymer films, with or without embossing, and if necessary coated with a release material (e.g., a silicone) may also be used.

In summary, my invention comprises a pressure sensitive adhesive tape having (1) a reinforced fibrous backing, (2) an aggressive adhesive based on an isoprene-styrene block copolymer, a resinous tackifier preferably of the polyolefin type, and a suitable extension oil preferably of the naphthenic variety, (3) a polyacrylate plasticized polyvinyl chloride backsize, and (4) a release coat based on a silicone rubber. The tape has particular utility in combination with a protective sheet as a fastener for disposable diapers.

Accordingly, the primary object of the invention is to provide a unique, aggressively tacky pressure sensitive adhesive tape having desirable tear and tensile strength properties.

Another object is to provide such a pressure sensitive adhesive tape that is especially suited for use as a disposable diaper fastening device.

These and other objects will become more apparent upon reference to the following specification and drawings wherein there are described various selected embodiments of the invention.

BRIEF DESCRIPTION OF THE DRAWINGS

FIG. 1 is a plan view in partial section of a pressure sensitive adhesive tape according to this invention, and FIGS. 2 and 3 illustrate the tape of the invention in combination with a disposable diaper and protective sheet.

DESCRIPTION OF THE PREFERRED EMBODIMENTS

The exact physical strength requirements for a diaper tape depend upon a complicated array of factors, but it is known that some tapes having tensile strengths as high as 15 lbs./inch width in the long direction of the tape tab have failed in use. Because of production machine considerations, it is desirable to cut the tabs from a supply roll having a width corresponding to the long direction of the tabs. This puts the major tensile stress in the weaker direction of paper webs, and the major tearing stress is also in an unfavorable direction. This makes the tape backing requirements quite severe. It is interesting to note that even on very weak film diaper backings, tapes fail while the backing remains intact. These failures result from a complex variety of stresses some of which are applied at high rates of speed. Undoubtedly failure is sometimes the result of a series of stresses, each of which disrupts some of the fiber-binder structure in the tape backing until failure finally occurs. Regardless of the mechanism by which failure occurs, it has been found that tape bases having CD (cross direction) tensile strengths above 25 lbs./inch, along with an elongation above about 10% in the same direction, have adequate strength for use on diapers. The tensile and elongation are both very sensitive to rate of application of stress, and these limits are for tape bases strained at 12 inches per minute on a 5 inch span. This measure of elongation provides the toughness needed to prevent the initiation of a tear. Generally the basis weight of saturated backings used in the present invention is in the range of from 50 to 120 lbs./3,000 ft.$^2$, preferably 60 to 90 lbs./3,000 ft.$^2$.

The adhesive for a good diaper tape must, of course, have good adhesion to polyethylene film. It must also have good shear resistance, since most of the force exerted on the tape is parallel to the length of the tape tab. An adhesive system based on styrene-isoprene block copolymers such as are described in U.S. Pat. No. 3,239,478 for example, and specifically Kraton 1107 (Shell Chemical Company) has been found to be satisfactory. The elastomer may be tackified with a variety of conventional tackifiers to give good adhesion to polyethylene film. However, the adhesives prepared without further compounding are characterized by a harsh or jerky peel as well as low quick stick, as defined below. Inclusion of rubber extension oils, which serve as plasticizers, correct this deficiency. An antioxidant must be included as is the usual practice in pressure sensitive systems. Fillers may also be used but are not essential. In general, adhesive coating weights of from about 0.8 to 1.8 oz. per square yard can be used, but weights within the range of from about 1.0 to 1.5 oz./yd.$^2$ provide the best compromise of cost and performance.

Adhesive tests used to characterize the tapes of this invention includes the standard tests of the Pressure Sensitive Tape Council (PSTC) as described in "Test Methods for Pressure Sensitive Tapes," 6th ed., Specifications and Technical Committee, Pressure Sensitive Tape Council: Peel Adhesion (PSTC-1) and Quick Stick (PSTC-5), as well as modified tests to study adhesion to polyethylene and Quick Stick to polyethylene. To measure adhesion to polyethylene, the same polyethylene film used in disposable diapers was fixed to steel panels by first applying to the panels an unsupported, pressure-sensitive adhesive film. This adhesive was transferred from release paper which was removed and the exposed adhesive covered with diaper liner. The resulting panels were used only once. Tapes were applied to the film-covered steel panels and Quick Stick to polyethylene determined just as in PSTC-5. Adhesion to polyethylene was measured on panels prepared in the same way, but the test samples were rolled as in PSTC-1 before testing. The actual peel test was run at a 90° angle using the same jig used in PSTC-5.

Shear resistance has been measured by the standard PSTC-7 procedure, modified by tilting the apparatus 10° from vertical so that a peel component is introduced into the test. It has been found that actual use failures occur with adhesives having rather high shear ratings. By introducing peel forces simultaneously with shear, such adhesives often show a weakness in "holding power."

EXAMPLE 1

An 80 lb./3,000 sq. ft. kraft tape base, beater treated with nitrile rubber, manufactured by Premoid Corporation, is a suitable tape base. This base was backsized with the following backsize formulation, using a coating weight of 15 lb./3,000 sq. ft. (In these examples, parts are by weight unless otherwise noted.)

Rhoplex B 15 (a trademark for a polyacrylate emulsion from Rohm & Haas) — 75
Acetic Acid — 0.07
Geon 352 (trademark for a polyvinyl chloride emulsion from B. F. Goodrich) — 25
TiO$_2$ — 100

A release coat was then applied over this backsize using the following silicone coating:

Syl-Off 23 (trademark-Dow Corning Corp.) — 25
Perchlorethylene — 150
Syl-Off 297 (trademark-Dow Corning Corp.) — 0.6

Dow Corning C-4-2117 — 0.9
Dow Corning 176 — 0.9

All the active ingredients of this formulation are sold by Dow Corning Corporation. Approximately 0.9 lbs./3,000 sq. ft. of the silicone coating were applied and well cured by heating to approximately 400° F for a few seconds.

The release coated sheet was next coated with the following adhesive composition:

Kraton 1107 (styrene-isoprene block polymer from Shell Chemical Co.) — 100
Sta-Tac 100 (a polyolefin tackifier from Reichhold Chemical Co.). — 125
Di-t-butyl-p-cresol (antioxidant) — 2
Sunthene 3120 (a naphthenic oil from Sun Chemical Co.) — 25
Hydrated alumina — 25 the adhesive was applied from a solution in a blend of aromatic and aliphatic hydrocarbons. A coating weight of about 1.2 oz./sq. yd. was used. The resulting tape was slit into rolls 2¾ inches wide, suitable for preparation of diaper tape tabs.

EXAMPLE 2

A 54 lb./3,000 sq. ft. base paper made from bleached kraft fiber was saturated with 50 parts of the following formulation for every 100 parts of fiber.

Rhoplex B 15 (trademark-Rohm and Haas Co.) — 100
Aquapel S-380 (trademark for an alkylketene dimer sizing agent sold by Hercules, Inc.) — 1

The saturated base was subsequently coated with backsize, release coating, and adhesive as in Example 1.

EXAMPLE 3

A commercially available pressure-sensitive tape submitted by the supplier as a potential diaper tape. This example is included to illustrate the need for surprisingly high physical strength. The tape consisted of a unified and release-coated paper backing and a rubber-based adhesive. While the adhesive characteristics were satisfactory, the tape failed in use tests.

EXAMPLE 4

An experimental adhesive containing excessive extension oil, and applied to the same base paper of Example 1, also failed in use tests. The adhesive formulation used was:

Kraton 1107 — 100
Sta-Tac 100 — 125
CAO-1 (trademark for antioxidant-Catalin Corporation of America) — 2
Sunthene 3120 — 100
Hydral 705 (trademark for hydrated alumina-Aluminum Corporation of America) — 25

This adhesive is substantially softer than that of Examples 1 and 2, which provides a high level of resistance to peel from polyethylene film when applied with little pressure and peeled manually. It also retains considerable shear resistance when measured by PSTC-7, but does not provide sufficient "holding power" when a peel component is introduced in the shear test.

This adhesive was evaluated with laboratory samples, coded 4a, using the same base as in Example 1, but without backsize or release coatings. For direct comparison, the adhesive of Example 1 was applied in the same way to the same uncoated base, and coded 4b. Since the physical strength of the tapes is derived almost entirely from the backing, physical properties of these samples were not measured.

TABLE I
PHYSICAL PROPERTIES

|  | Ex. 1 | Ex. 2 | Ex. 3 |
|---|---|---|---|
| Basis Wgt.lbs./3000 sq. ft. | 124 | 118 | 110 |
| Caliper-mils | 8 | 8 | 7 |
| CD Tensile lbs./inch width (1 inch span, constant rate of elongation at 200%/min.) | 22.9 | 29.2 | 15.2 |
| CD Elongation — % | 21 | 17 | 16 |
| MD Finch Edge Tear — lbs. | 15.3 | 31.1 | 14.8 |
| MD Elmendorf Tear— g./16 Sheets | 138 | 122 | 80 |
| Delamination Resistance oz./inch width | 28 | 22 | 30 |

TABLE II.—ADHESIVE TESTS

| Example: | Adhesive wt. (oz./ sq. yd.) | Adhesion to PE (oz./in.) | Quick-stick to PE (oz./in.) | Panel adhesion (oz./in.) | Holding power (80° shear)(min.) |
|---|---|---|---|---|---|
| 1 | 1.2 | 42 | 20 | 72 | >2,500 |
| 2 | 1.9 | 46 | 18 | 66 | >2,500 |
| 3 |  | 30 | 20 | 74 | 1,100 |
| 4a | (¹) | 18 | 14 | 40 | 22 |
| 4b | (¹) | 27 | 19 | 54 | >2,500 |

¹ 4 wet mils.

Methods for preparing such tapes are well known. Basically, the preferred procedure is to coat the base with the backsize, dry it at 225° F and then apply the release coating. The release coated material is dried and cured at an elevated temperature (e.g. 350°–400° F). The adhesive is then applied, and the product is wound into rolls. Conventional equipment such as reverse roll or knife-over-roll coaters, dryers, etc. may be used as is well known in the art.

Referring to FIG. 1, adhesive tape 10 includes base 12, backsize 14, release coat 16, and pressure sensitive adhesive 18.

FIGS. 2 and 3 illustrate a disposable diaper incorporating the pressure sensitive adhesive tape of this invention. Diaper 20 may be of conventional construction comprising a main absorbent pad 22 consisting of wood pulp fluff, layers of cellulose wadding, absorbent cotton fibers, and the like. Pad 22 has a thin, impervious backing 24 which may be typically pigmented and embossed 1 mil polyethylene. The outer surface of the film backing 24 may be treated by corona discharge or the like so as to be more receptive to adhesive. Film backing 24 is usually at least coextensive with pad 22 but preferably extends around the edges of the pad and partially overlaps the top of the pad. The top surface of the pad 22 is covered with a fluid pervious sheet 26 which is usually of nonwoven construction and may be hydrophilic or hydrophobic. Cover sheet 26 may be attached to film backing 24 either on top of the overlapping edge as shown in FIG. 3 or underneath the overlapping edge. In other constructions cover sheet 26 may extend around the sides of pad 22 and be attached on the bottom side of the diaper either over or under film backing 24, or cover sheet 26 and film backing 24 may extend beyond the diaper edges and be heat sealed together.

Near one end of the diaper 20 and at opposite edges thereof are attached narrow strips 28 of the pressure sensitive adhesive tape with one end extending beyond the respective edges of the diaper. The pressure sensitive adhesive coating 18 on the surface of these extensions is covered by protective cover strip 30. Cover strip 30 is usually wider and longer than tape 10 to provide a convenient handle for removal. The inwardly disposed end of the cover strip preferably extends over the face of the diaper.

The pressure sensitive adhesive composition may be varied within certain ranges to insure that an adequate adhesive force is obtained. Thus, in Example 1, using 100 parts by weight of the block copolymer (Kraton 1107) as the basis; the amount of tackifier may be in the range of from 75 to 150; and the antioxidant in the range of from 0.5 to 3.0; the extension oil in the range from 10 to 75 parts; and the filler in the range from 0 to 50 parts all by weight.

The amount of saturant used in the fibrous backing may be within the range of from about 20 to about 80 dry parts of fiber with the range of from 35 to about 65 being preferred based on cost and performance characteristics. Additional examples of suitable saturants include Hycar 2671 (trademark) from B. F. Goodrich and Rhoplex P-206 (trademark) from Rohm and Haas.

The backsize may be pigmented with up to 100 parts pigment per 100 parts resin, if desired, and preferably includes 20 to 65 parts of a suitable pigment such as titanium dioxide, carbonates, and clay, for example.

Similarly the ingredients of the backsize may be varied, using from 50 to 150 parts of the polyacrylate for every 100 parts of polyvinyl chloride, depending on the pigment level utilized. Also the actual weight of coating may be varied from about 10 to 25 lbs./3,000 sq. ft. While the preferred polyacrylate is that identified as Rhoplex B15, others such as those disclosed in U.S. Pat. No. 3,066,043 may be utilized as well.

The ingredients of the release coating can also be varied within the limitations of release level desired while assuring adequate cure to prevent transfer to the adhesive.

A suitable protective release strip for the pressure sensitive mass on the ends of the strip which extend beyond the edge of the diaper 13 is preferably polyethylene film which may vary in thickness within the range 3–6 mils. The film preferably has a release coat e.g. a coating based on silicone. Other fairly rigid films such as polypropylene, polyesters, and polyvinyl chloride may also be used as the protective cover sheet as well as silicone coated glassine type paper.

Extensive testing of the tape of this invention under actual use conditions indicates that attachment strengths greater than required to tear 1 mil polyethylene film diaper backing are consistently obtained. The failure rate in use of the tape of the invention was less than 0.2 percent in 800 tests.

While the pressure sensitive adhesive tape of the invention has been described with reference to specific embodiments and to disposable diaper applications, other embodiments and uses will suggest themselves to those skilled in this art wherever a strong, inexpensive pressure sensitive tape is required.

I claim:

1. A strong pressure sensitive adhesive tape which has excellent adhesion to polyethylene film comprising a reinforced fibrous backing,
a backsize coating of polyvinyl chloride plasticized with a polyacrylate on one side of said backing,
a release coating of silicone rubber over said backsize, and
an adhesive coating on the side of said backing opposite from said backsize and release coatings, said adhesive comprising an aggressively tacky block copolymer of isoprene and styrene tackified with a polyolefin.

2. The tape of claim 1 wherein said backing has a basis weight in the range of 50 to 120 lbs./3,000 ft.$^2$ and is saturated with 20 to 80 parts/100 parts fiber of polyacrylate binder.

3. The tape of claim 1 wherein said backing is a unified paper including Kraft fibers beater treated with acrylonitrile rubber.

4. The tape of claim 2 wherein said backsize coating comprises the following proportions of ingredients: 100 parts polyvinyl chloride, 50 to 150 parts polyacrylate, and 30 to 195 parts titanium dioxide.

5. The tape of claim 3 wherein said backsize further includes about 20 to 65 parts of a decorative pigment per 100 parts of resin and is applied in the amount of about 10 to 25 lbs. per 3,000 sq. ft.

6. The tape of claim 4 wherein the adhesive is applied in the amount of about 0.8 to 1.8 oz. per square yard and comprises, in parts by weight:
Block copolymer — 100 parts
Polyolefin tackifier — 75 to 150 parts
Antioxidant — 0.5 to 3.0 parts
Naphthenic oil — 10 to 75 parts
Filler — 0 to 50 parts 7. A diaper tape adapted for use as fasteners with disposable diapers of the type combining an absorbent pad with a fluid pervious cover and a fluid impervious thin film backing comprising, a reinforced fibrous backing,
a backsize of from 10 to 20 lbs./3,000 sq. ft. of pigmented polyvinyl chloride plasticized with a polyacrylate on one side of said backing,
a release coat of from 0.1 to 1.0 lbs./3,000 sq. ft. of catalyst-cured silicone rubber over said backsize, and
an adhesive on the side of said backing opposite from said backsize and release coat, said adhesive comprising an aggressively tacky block copolymer of isoprene and styrene tackified with a polyolefin.

8. An improved disposable diaper of the type having an absorbent pad with a fluid-pervious cover, a fluid-impervious thin film backing, and pressure sensitive adhesive tape fastening means, the improvement wherein said pressure sensitive adhesive tape comprises, a reinforced fibrous backing,
a backsize coating of polyvinyl chloride plasticized with a polyacrylate on one side of said backing,
a release coating of catalyst-cured silicone rubber over said backsize, and
an adhesive coating on the side of said backing opposite from said backsize and release coatings, said adhesive comprising an aggressively tacky block copolymer of isoprene and styrene tackified with a polyolefin, and extended with a naphthenic oil.

9. The diaper of claim 8 wherein said tape backsize coating is applied in the amount of about 10 to 25 lbs./3,000 ft.$^2$ and comprises the following proportions of ingredients: 100 parts polyvinyl chloride, 50 to 150 parts polyacrylate, and 30 to 195 parts pigment.

10. The diaper of claim 9 wherein said tape adhesive is applied in the amount of from about 0.8 oz. to 1.8 oz. per square yard and comprises, in parts by weight:
Block copolymer — 100 parts
Polyolefin tackifier — 75 to 150 parts
Antioxidant — 0.5 to 3.0 parts
Naphthenic oil — 10 to 75 parts
Filler — 0 to 50 parts

* * * * *